Oct. 29, 1963
R. K. ULM
3,108,784
VEHICLE JACK STRUCTURE WITH ADJUSTABLE
EFFECTIVE LENGTH LIFT MEANS
Filed Dec. 1, 1961
2 Sheets-Sheet 1
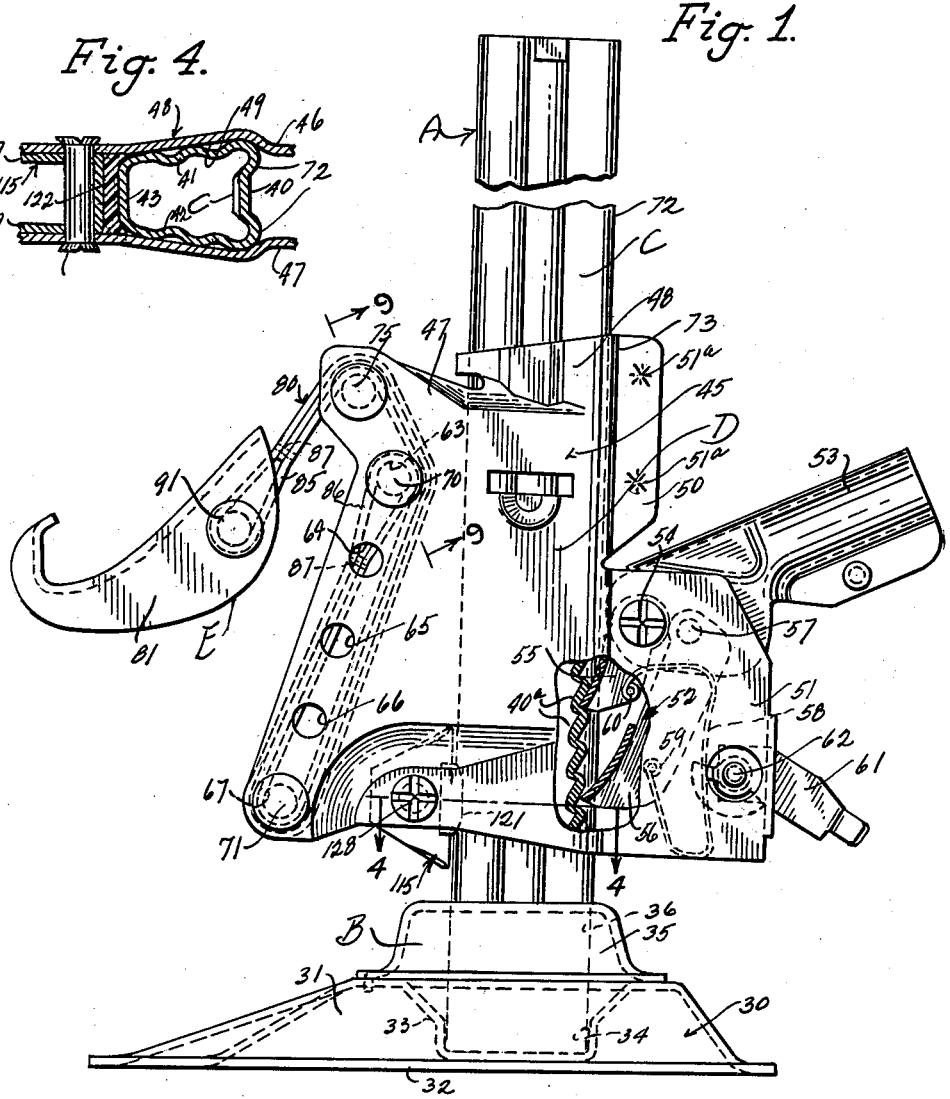
INVENTOR
RUSSELL K. ULM
BY *Rommel, Allwein & Rommel*
ATTORNEYS

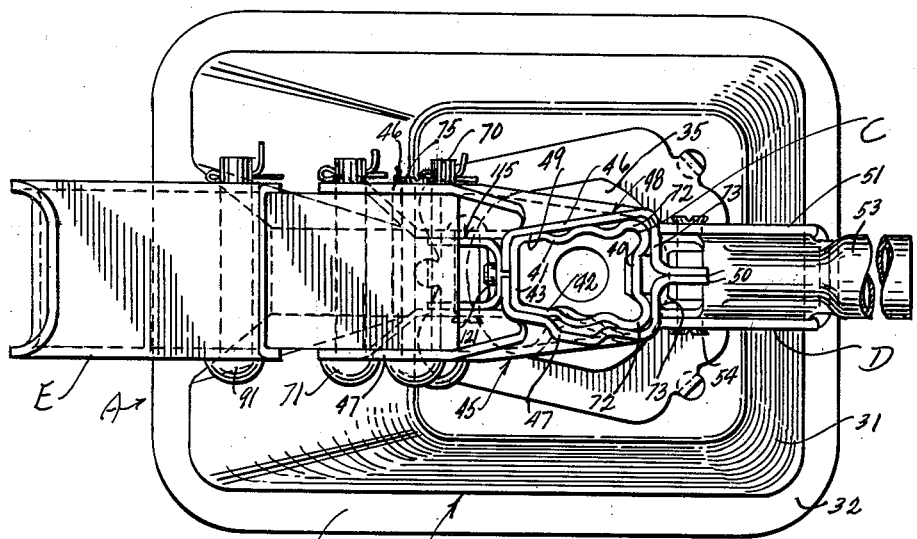
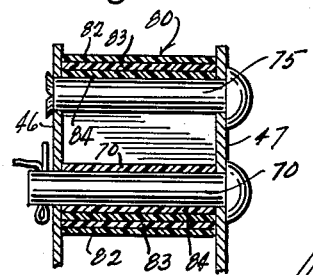
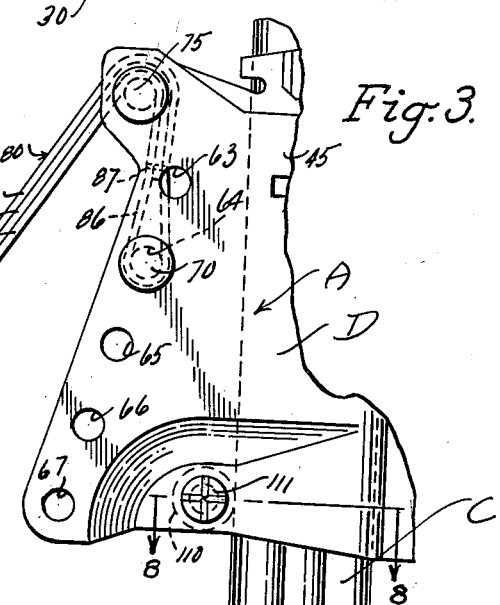
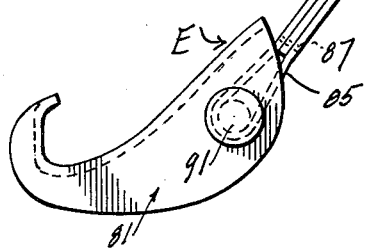
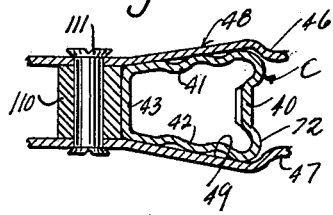

United States Patent Office 3,108,784
Patented Oct. 29, 1963

3,108,784
VEHICLE JACK STRUCTURE WITH ADJUSTABLE EFFECTIVE LENGTH LIFT MEANS
Russell Keith Ulm, Butler, Ind., assignor to Universal Tool & Stamping Company, Inc., Butler, Ind., a corporation of Indiana
Filed Dec. 1, 1961, Ser. No. 156,399
6 Claims. (Cl. 254—110)

This invention relates to improvements in vehicle jacks.

The primary object of this invention is the provision of a vehicle jack having improved bumper or vehicle engaging and supporting means which will enable a convenient application of the same to different parts of an automotive vehicle for the purpose of lifting the same.

Automobile jacks for the most part are provided with a rack bar having a movable housing thereon provided with a lift extension which in some cases will not perform the duty of proper engagement with a desired part of the vehicle. It is therefore a purpose of the present invention to provide an improved flexible and adjustable lift member adapted to be connected with the housing of the jack structure so that it may engage at various parts of the automotive vehicle, and particularly the bumper thereof, for the purpose of efficient application of the same to the vehicle to insure proper jack vehicle lift action.

A further object of this invention is the provision of an automobile vehicle jack structure including a rack bar having a movable casing thereon provided with appropriate pawl mechanism for engagement with the teeth of the rack bar, and which casing is provided with an improved adjustable lift means whereby the vehicle engaging portion may be variably extended with respect to the casing of the jack structure to insure proper application upon different sized bumpers and parts of the vehicle.

Other objects and advantages of this invention will be apparent during the course of the following detailed description.

In the accompanying drawings, forming a part of this specification, and wherein similar reference characters designate corresponding parts through the several views:

FIGURE 1 is a side elevation, partly in section, of the improved jack structure, more particularly showing the improved vehicle engaging and lifting means associated therewith.

FIGURE 2 is a plan view of the jack structure shown in FIGURE 1.

FIGURE 3 is a fragmentary view showing a part of the jack structure of FIGURE 1, with a different adjustment of the vehicle engaging lift means than shown in FIGURE 1.

FIGURE 4 is a transverse cross sectional view taken substantially on the line 4—4 of FIGURE 1.

FIGURE 5 is a plan view of an anti-friction device adapted for use upon the jack between the slide housing and rack bar.

FIGURE 6 is a cross sectional view taken substantially on the line 6—6 of FIGURE 5.

FIGURE 7 is a top plan view of the metal clip portion of the anti-friction device as shown in FIGURES 5 and 6.

FIGURE 8 is a cross sectional view of a modified form of antifriction device, taken substantially on the line 8—8 of FIGURE 3.

FIG. 9 is a cross sectional view taken substantially on the line 9—9 of FIGURE 1.

In the drawings, wherein for the purpose of illustration the invention is shown, the letter A may generally designate the complete jack assemblage which includes a base B, rack bar C, movable lifting assemblage D and an improved means E for vehicle engagement.

The base construction B is known in the art, and includes a stamped metal inverted cup-shaped main portion 30 having a body 31 and foot flanges 32 surrounding the same. A downwardly depending socket portion 33 is formed integral with the portion 31. It has a rack bar receiving socket 34 in the lower portion thereof. Spot welded to the upper wall of the portion 31 is a dome 35 provided with an opening 36 therethrough for receiving the lower end of rack bar C.

The rack bar C is of polygonal tubular formation, and is constructed as described in a co-pending application Serial No. 156,398 filed December 1, 1961. So far as the present invention is concerned it consists of a rear wall 40, side walls 41 and 42 which extend at an angle of less than 90° with respect to the wall 40 and converge together and are connected to a front wall 43. The rear wall 40 has trackways 72 projecting rearwardly and extending the length of bar C which engage either an antifriction device (not shown) or the turned in wall portions 73 of the slide casing as shown in FIG. 2.

The lifting assemblage D preferably comprises a metal casing structure 45 comprising side walls 46 and 47 formed to provide a central portion 48 shaped to provide therethrough a passageway 49 for slidably receiving the bar C. The upper rear portions of the walls 46 and 47, shown at 50 in the drawings, are welded together at 51ª and the lower portions of the walls 46 and 47 have a rear pawl supporting extension 51. The pawl mechanism 52 is conventional and operates for the most part as set forth in a co-pending application Serial No. 156,398, filed December 1, 1961. The same includes a pawl actuated member 53 which is in effect a handle receiving socket pivoted at 54 on the extension 51. A short pawl 55 is also pivoted at 54 and adapted to act upon the rack teeth 40ª of the bar C. A longer pawl 56 is pivoted at 57 on the extension 51 also adapted to act on the rack teeth 40ª. A looped spring 58 is provided in the housing for the assemblage D connected at one end at 59 to the lower end of the longer pawl 56 and connected at its other end at 60 to the lower end of the shorter pawl. The function of this spring is to urge the free ends of the pawls into engagement with the rack teeth. A trip lever 61 is pivoted at 62 upon the housing of the jack for engagement with the bight portion of the spring 58. When in the position shown in FIG. 1 the spring induces a compressive force large enough to overcome both the tensile and compressive forces introduced into the spring by the alternate up and down movements of the long pawl 56. When the trip lever 61 is lifted out of operation the up and down movement of the handle of the jack and the member 53 will result in the jack descending upon the rack bar C. The shorter pawl 55 will engage the teeth 40ª and the load will be transferred from the short pawl to the long pawl 56. The jack lifting assemblage moves upwardly when the handle is moved downwardly and when the handle is rotated upwardly the longer pawl 56 is pulled upwardly in the next tooth 40ª of the rack bar.

At the front of the rack bar, the walls 46 and 47 project appreciably forwardly of the front edge of the rack bar C and are spaced to receive details of the vehicle engaging lift mechanism E. The forward margins of the walls 46 and 47 are provided with an aligning series of openings 63, 64, 65, 66 and 67 therein which are adapted to detachably receive therein webbing attaching pins or shafts 70 and 71. These pins are identical and as shown in the cross sectional view of FIGURE 9 the pin 70 extends transversely between the aligned openings in the flanges of the walls 46 and 47 and each pin has a head and at the opposite end thereof receive a detachable cotter pin for easy detachment of the pins, since they serve the purpose of holding the length adjustment of the lift means for engaging the vehicle. The forwardly extending flanges of the walls 46 and 47 at the top thereof support a permanent horizontal pin 75 which may have a spacing sleeve thereon (not shown) to hold flanges in properly spaced relation.

The lift means E comprises flexible lift webbing 80 and a vehicle engaging hook 81 secured thereto. The webbing 80 for its main length is of three ply formation, including the forward ply 82, the rear ply 83 and the intermediate ply 84, appropriately stitched together longitudinally and transversely (not shown in the drawings except at 87). This webbing is constructed of a single piece of material and at the ends thereof provides a forward loop 85 and a rear pin engaging loop 86. The webbing 80 is adapted to be trained over the fixed pin 75 and its looped end 86 receives one or the other of pins 70 and 71 therein. The loop 85 is adapted to support the vehicle bumper engaging hook 81 which is provided with a detachable pin 91 therein. The hook 81 swivels in the loop 85 so it may easily be hooked under the vehicle bumper or some available part of the vehicle.

The webbing 80 is preferably constructed of flexible nylon and for conventional jacks it may be 1¾ inches in width and have a breaking strength of 3600 pounds, although the size and strength characteristics are optional, depending of course upon the intended use of the jack.

The loop 86 may be attached to the pin 70 which may be extended through any of the aligning openings of the two housing flanges. Thus, as shown in FIG. 3, the length of the webbing is for its second longest extension, and as shown in FIG. 1 the loop 86 is received on the pin 70 located in the opening 63 but the webbing here is trained around the lower pin 71 and this shortens the effective length of the webbing to its shortest possible length.

It can readily be seen from the foregoing that the webbing 80 has five different effective length adjustments by varying the position of the pin 70 in the openings 63, 64, 65, 66 or 67. It may further have four additional shorter effective lengths by training the webbing around the pin 71 as shown in FIGURE 1 and locating the pin 70 in any of the other four openings 63, 64, 65, and 66.

As shown in FIGS. 3 and 8 of the drawings an antifriction device may be provided in the nature of a roller 110 rotatably mounted on a pin 111 secured upon the forwardly extending portions of the walls 46 and 47. The roller 110 engages the rear wall 43 of the rack bar. This is a logical place for an anti-friction device since the load bearing on the pin 75 fulcrums the jack casing at the roller 110 upon the rack bar C.

It is proposed to provide a synthetic resin slide in lieu of the roller 110 and the details thereof are shown in FIGS. 1, 4, 5, 6 and 7. This device generally indicated at 115 comprises a U-shaped metal clip 116 having attaching legs 117 and 118 and a bight portion 119. The bight portion 119 is recessed at 120 and adapted to receive a solid synthetic resin anti-friction member 121; a cross portion 122 of the clip holding it in place. As is shown in FIG. 7 the bight portion 119 is provided with triangular shaped openings 123 therein adapted to receive in snapped relation therein projections 124 formed on the inner side of the member 121. The member 121 is face grooved at 127 to fit the contour of the rear wall 43 of the jack, as shown in FIG. 4. A pin 128 is secured to the walls 46 and 47 and through the openings 129 in the clip walls 117 and 118 to hold the clip in position. The synthetic resin member 121 may be made of solid nylon or Du Pont "Delrin 500" which is an acetal resin known as polyoxymethylene.

Various changes in the size, shape and arrangement of parts may be made to the form of invention herein shown and described without departing from the spirit of the invention or scope of the claims.

I claim:

1. In a vehicle jack structure the combination of a rack bar, a casing slidably mounted on the rack bar for movement therealong, means on the casing and rack bar for advancing and retracting the casing along the rack bar, said casing including a pair of relatively spaced walls each provided with a series of openings therein in which an opening of one wall aligns with an opening of the other, a detachable pin for extension through a selected set of aligned openings, a second pin connected to said casing walls above said openings, a strong flexible length of material having at an outer end portion thereof a vehicle engaging lift member, said material extending from said lift member around the last mentioned pin and from thence between the walls and being connected remotely from the lift member with the detachable pin.

2. In a vehicle jack the combination of a rack bar, a casing slidably mounted on the rack bar, means on the casing and rack bar for advancing and retracting the casing along the rack bar, said casing including a pair of spaced walls extending forwardly from the rack bar, an uppermost fixed pin on said walls, said walls below said fixed pin having a series of openings transversely therethrough, the opening of one wall aligning with a complementary opening of the other wall, detachable pin means for mounting in selected sets of the aligned openings of said walls, a flexible lift webbing having means at an end portion thereof for vehicle engagement and extending over the fixed pin and connected to the detachable pin means.

3. In a jack construction including a rack bar having a casing and pawl, means on the casing and rack bar for advancing and retracting the casing along the rack bar, said casing having a pair of relatively spaced walls provided with a series of openings therealong one above the other, pins detachably mounted transversely through the openings of the walls one above the other, an uppermost pin connected to said walls, a flexible lift webbing having vehicle engaging hook means mounted at an outer end thereof and extending over the uppermost pin and then projected between the walls and being looped under the lowermost of said detachable pins and extended upwardly and at its end remote from the hook means being connected upon the uppermost detachable pin.

4. In a vehicle jack structure the combination of a supporting bar, a casing slidably mounted on the supporting bar for movement therealong, means on the casing and bar for advancing and retracting the casing along the bar, said casing having spaced openings transversely therethrough one above the other, a detachable pin for selective extension within said openings, a second pin connected to the casing in one of said openings located above the opening in which the first mentioned pin is disposed, and flexible lift means having an outer end thereof provided with a vehicle engaging lift member, said flexible lift means extending around the uppermost pin and from thence extending downwardly and being connected remotely from the lift member with the detachable pin first mentioned.

5. In a vehicle jack structure the combination of a supporting bar, a casing slidably mounted on the supporting bar for movement therealong, means on the casing and bar for advancing and retracting the casing along the bar, said casing having a series of relatively upwardly spaced openings therealong, an upper pin connected in one of said openings, a lower pin connected in another of said openings, and an intermediate pin connected in a third of said openings, the lower and intermediate pins being capable of selective projection through any of the openings below the upper pin, and a flexible lifting construction having a flexible lift member connected at an outer end thereof and said flexible lift member being trained over the upper pin and thence extended downwardly around the lower pin and having its end opposite the lift member connected to the intermediate pin.

6. The vehicle jack structure defined in claim 5 in which the flexible lifting construction comprises a strong flexible webbing doubled upon itself and trained over said pins in said doubled condition.

References Cited in the file of this patent

UNITED STATES PATENTS

| | | |
|---|---|---|
| 1,321,950 | Templeton | Nov. 18, 1919 |
| 1,325,964 | Templeton | Dec. 23, 1919 |
| 2,249,050 | Schmidt | July 15, 1941 |
| 2,630,297 | Hunz | Mar. 3, 1953 |
| 2,743,903 | Lucker | May 1, 1956 |

FOREIGN PATENTS

| | | |
|---|---|---|
| 59,171 | France | Dec. 23, 1958 |